United States Patent [19]

Scharf et al.

[11] Patent Number: 5,490,731
[45] Date of Patent: Feb. 13, 1996

[54] SLEEVE BEARING WITH INTEGRATED LIP SEAL

[75] Inventors: Michael Scharf, Dietenheim; Gert Schneider, Langenau, both of Germany

[73] Assignee: Wieland-Werke AG, Ulm, Germany

[21] Appl. No.: 371,812

[22] Filed: Jan. 12, 1995

[30] Foreign Application Priority Data

Jan. 20, 1994 [DE] Germany .................... 44 01 526.7

[51] Int. Cl.⁶ ................................................... F16C 33/74
[52] U.S. Cl. ................................. 384/147; 277/152
[58] Field of Search .................................. 384/147, 148, 384/484, 486; 277/153, 152, 212 FB

[56] References Cited

U.S. PATENT DOCUMENTS

| | | | |
|---|---|---|---|
| 3,563,556 | 2/1971 | Scott | 277/153 |
| 3,804,217 | 4/1974 | Keijzer et al. | 277/153 |
| 4,210,339 | 7/1990 | Povejsil | 277/153 |
| 4,243,232 | 1/1981 | Repella | 277/153 |

FOREIGN PATENT DOCUMENTS 3412562  11/1984  Germany.

*Primary Examiner*—Lenard A. Footland
*Attorney, Agent, or Firm*—Flynn, Thiel, Boutell & Tanis

[57] ABSTRACT

The invention relates to a sleeve bearing provided with lip seals, which are each integrated into front areas of the sleeve bearing particularly for use in rough mixed friction operation. The lip seals each consist of a holding part, a support part and a pretensioned sealing lip, which rests linearly on an associated shaft/axis in the built-in state. The holding part force-lockingly engages into an annular groove. A cavity, which is formed between the shaft/axis and the holding part or rather the support part can be filled with a lubricant.

14 Claims, 5 Drawing Sheets

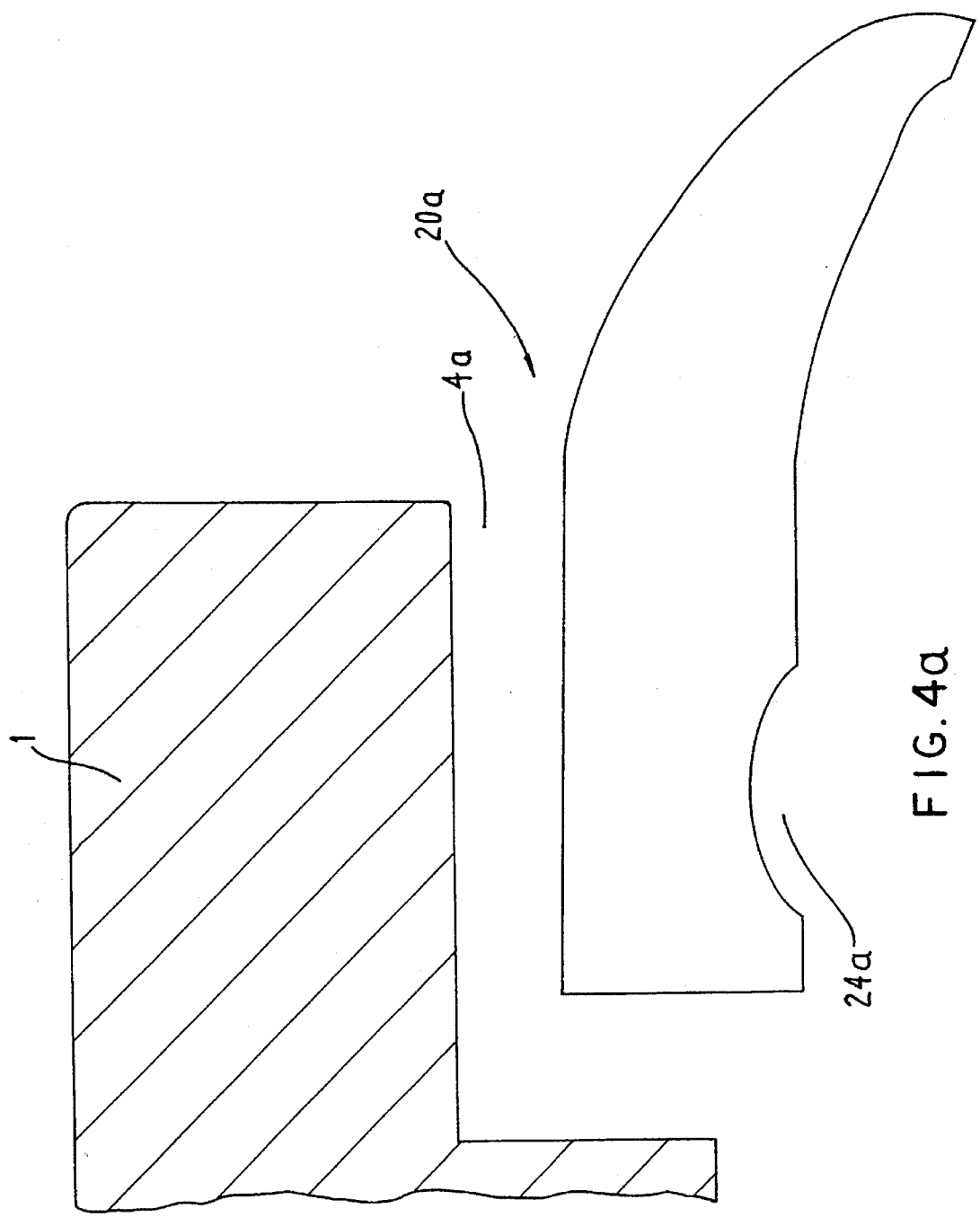

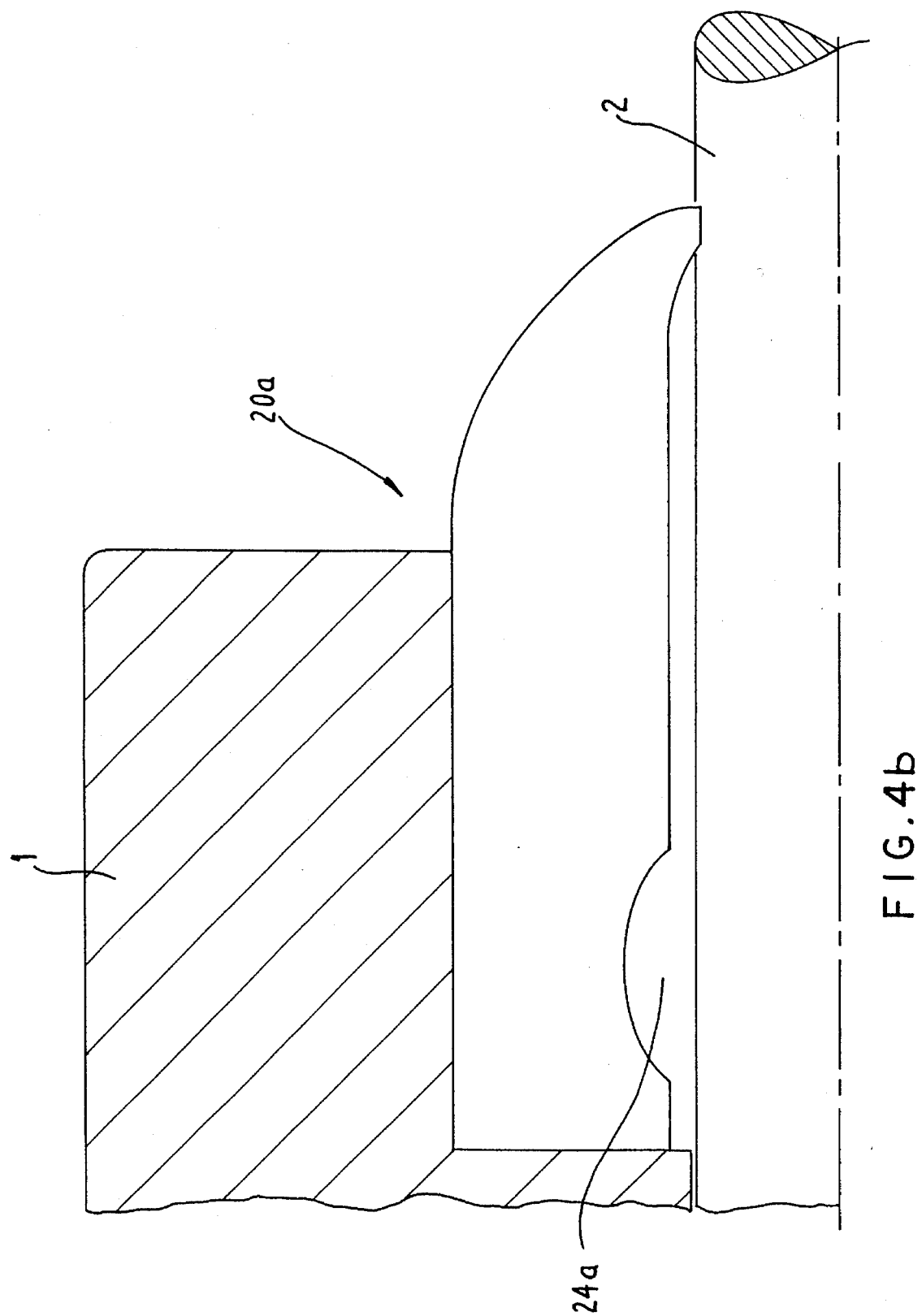

5,490,731

SLEEVE BEARING WITH INTEGRATED LIP SEAL

FIELD OF THE INVENTION

The invention relates to a sleeve bearing provided with an integrated lip seal.

BACKGROUND OF THE INVENTION

The reliable functioning of the sleeve bearings in a twisted or rolled design requires a sufficient sealing of the inner space of the bearing in order to avoid the entry of foreign substances.

Sleeve bearings of the mentioned type (for example, according to DE-PS 3 412 562) are utilized for service-free bearings using a solid lubricant.

The mounting and design of this lip seal, however, is relatively complicated because the holding parts of the lip seal must be form-lockingly inserted with two webs into two annular grooves. Furthermore, the device for the manufacture of the annular grooves is expensive and complex. This seal cannot be used for thin-wall rolled sleeves.

The basic purpose of the invention is to provide a sleeve bearing of the mentioned type in such a manner that it can be manufactured not only easily and inexpensively but also can be utilized, in particular, in grease-lubricated bearing points, in the rough mixed friction operation, where dirt and wear must be expected as well as repeated relubrication during the lifetime thereof.

SUMMARY OF THE INVENTION

The purpose is attained according to the invention by the holding part force-lockingly extending into an annular groove of the recess, by also providing a support part spaced from the shaft/axis between the holding part and the seal lip, and by attaching the sealing lip to the support part outside of the front surface.

The annular groove for fastening the lip seal can be manufactured in a simple manner since no complicated forming steels are needed. The mounting of the lip seal without any tools is easily possible and can also be done at a later time. In addition, with the outwardly shifted shoulder of the seal lip, protection against the penetration of foreign substances into the bearing is improved.

According to a preferred embodiment of the invention, the holding part is pressed with a holding foot into the annular groove. Thereby, the groove width preferably is $B \geq 0.6$ mm, and in particular, is in the range 0.8–1.5 mm, and the groove depth is $T \geq 0.5$ mm. The width S of the support edge for the support part preferably is chosen with $S \geq 0.5$ mm, and in particular, with 0.7–1.5 mm.

According to an alternative of the invention, the holding part is fastened with a self adhering substance (through gluing) in the recess instead of thorough force-locking fastening.

The thickness of the lip seal in both cases preferably is $D \geq 0.5$ mm.

Because of the inventive selection of the parameters, the suggested seal of the sleeve bearings can be utilized not only in thick-wall, but also in thin-wall, rolled sleeve-bearing sleeves which start with approximately a 1.5 mm wall thickness.

The ring thickness of the annular cavity in a further development of the invention preferably is $A \geq 0.1$ mm. It is hereby advisable to fill this annular cavity with lubricant for additional sealing. This grease collar has the effect such that, in spite of the outer sealing lip, foreign substances which could enter therein are held back and cannot advance into the sliding surface of the bearing. In addition, the lifetime of the sleeve bearing is increased.

In order to guarantee, particularly during the relubricating operation, an even exiting of the grease and an evening of wear connected therewith, it is suggested that the underside of the holding part and of the support part, which underside is directed toward the shaft, is designed smooth.

Furthermore, it is advantageous to arrange an annular cavity for the lubricant in the holding part, whereby its height H particularly should correspond to at least twice the ring thickness A. The seal lip preferably is attached to the support part without an offset in which dirt or the like could settle.

BRIEF DESCRIPTION OF THE DRAWINGS

The invention will be discussed in greater detail hereinafter using the following exemplary embodiments.
In the drawings:

FIGS. 4a and 4b show schematically a modification of the invention for fastening of the lip seal by adhesive.

DETAILED DESCRIPTION

Figure 1:
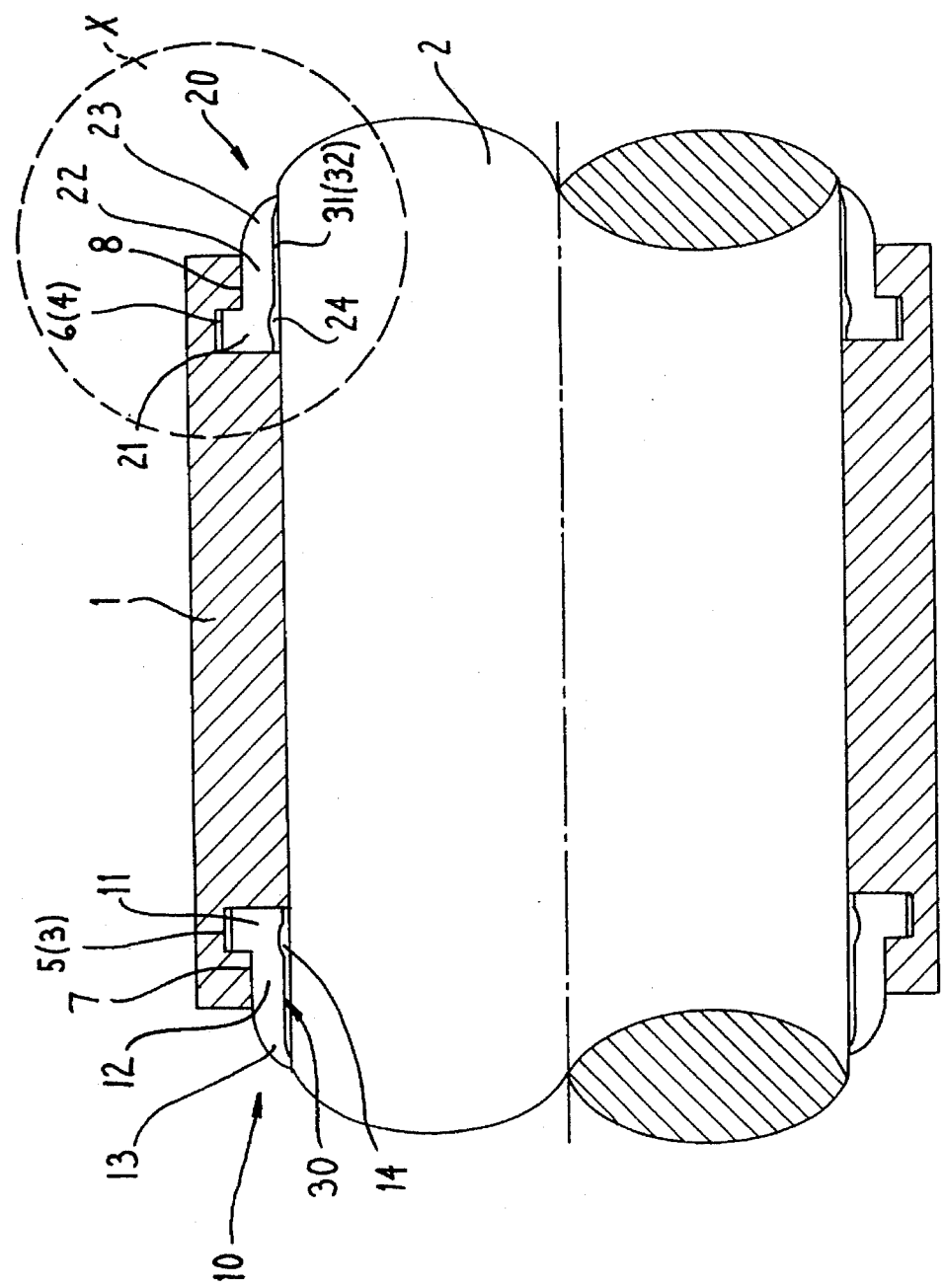
FIG. 1 is a cross-sectional view of a sleeve bearing of the invention.
Figure 2:
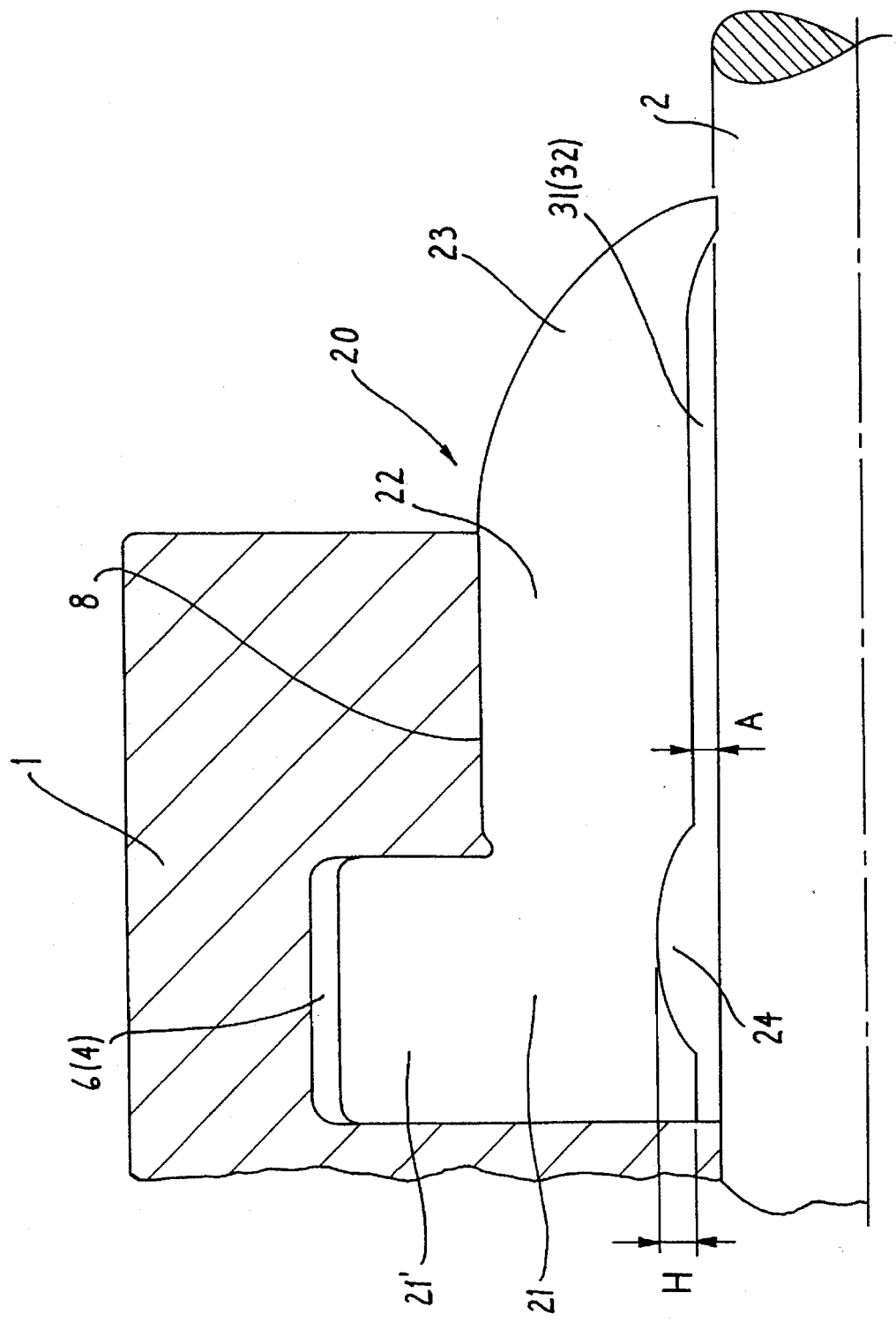
FIG. 2 shows a detail X according to FIG. 1 in an enlarged scale.

FIG. 1 shows a cross section of the sleeve bearing 1 in the form of a rolled or twisted metal sleeve, with which a shaft/axis 2 is associated as the sliding partner thereof.

Figure 3:
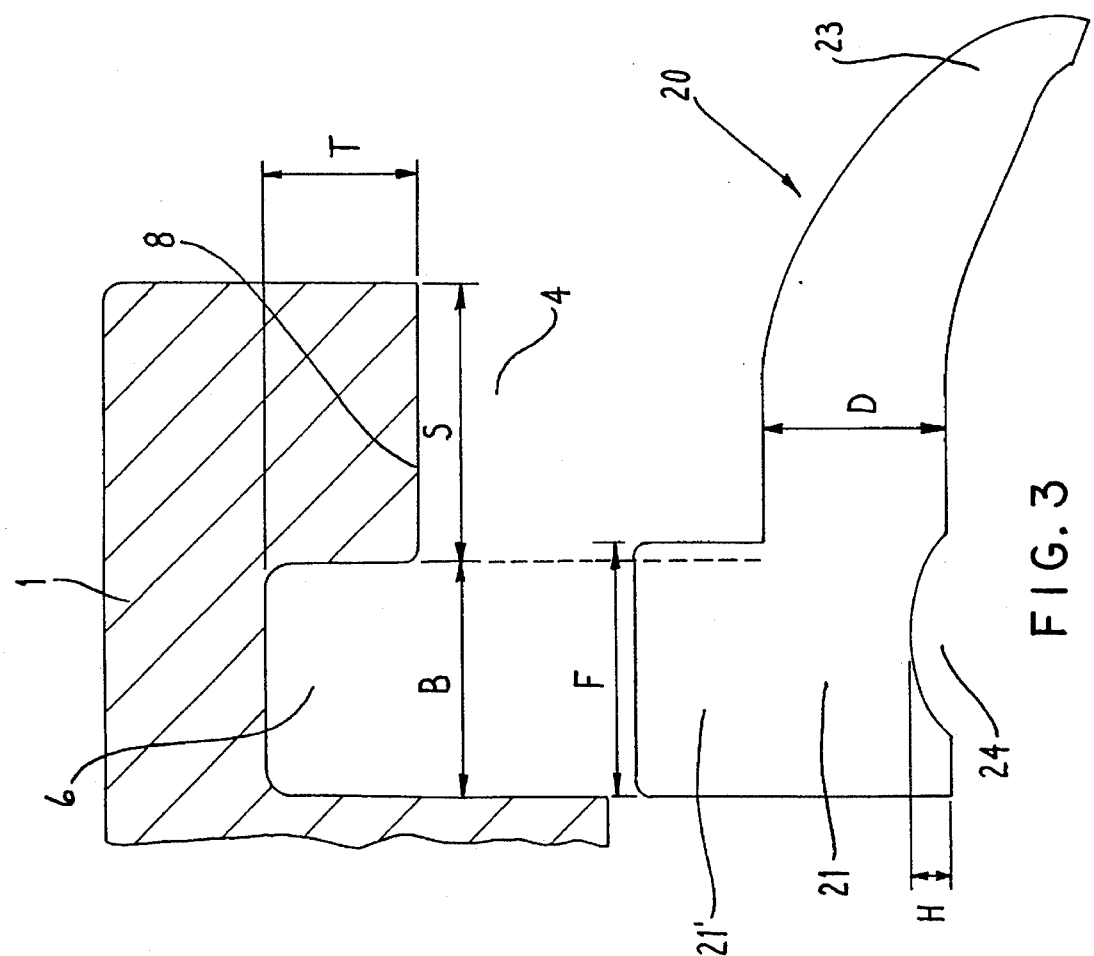
FIG. 3 shows an enlarged view of the lip seal being inserted into the associated recess.

The sleeve bearing 1 has recesses 3, 4 on its front side wherein lip seals 10, 20 force-lockingly extend into the recesses and have the thickness D and are preferably formed of an elastomer. The lip seals 10, 20 in turn each consist of a holding part 11, 21, a support part 12, 22 and a pretensioned sealing lip 13, 23, which rests linearly on the shaft/axis 2 when built in the bearing 1. The holding parts 11, 21 each have a holding foot 11', 21' by which they are pressed into associated annular grooves 5, 6 (groove width B and groove depth T) of the recesses 3, 4. The width F of the holding foot 11', 21' is thereby greater than the groove width B (F > B), in particular, compare FIG. 3. The sealing material is displaced by the pressing and is received by the annular groove 5, 6.

The adjacent support part 12, 22 is supported on the support edge 7, 8. The sealing lips 13, 23 are attached on the support parts 12, 22 outside of the front surfaces. The pretensioned form of the sealing lip 13, 23 assures a secure abutment of the sealing lip 13, 23 on the shaft/axis 2 particularly so that, together with the tapered, arched outer form of the sealing lip 13, 23, a damaging entry of water is avoided with certainty. Because of the small distance between the support part 12, 22 and the sealing-lip support, the support part 12, 22 does not bend, which otherwise could lead to a frictional contact between shaft/axis 2 and support part 12, 22.

The sealing member of the lip seals 10, 20 (which essentially consists of the holding part 11, 21 and the support parts 12, 22) is spaced from the shaft/axis 2 so that annular cavities 30, 31 having an annular thickness A are created in order to avoid friction. These cavities 30, 31 can be filled with lubricant 32 up to the linear bearing point of the sealing lips 13, 23 on the shaft/axis 2. Annular cavities 14, 24 for lubricant 32 can be arranged each in the holding part 11, 21, in an advantageous manner wherein the cavity has the height H which corresponds to at least twice the thickness A of each of the annular cavities.

FIG. 4 schematically illustrates an alternative of the invention, according to which a lip seal 20a is fastened with an adhesive (namely by gluing) provided in a recess 4a.

Numerical Example

A thin-wall, rolled bearing sleeve 1 made of a tin bronze (CuSn8) with the following dimensions: Outside diameter 44 mm×inside diameter 40 mm×width 40 mm, was pressed into a housing with an inside diameter of 44 mm (44 H7). Seals 10, 20 of the invention which are made of an elastomer (NBR) were mounted on both sides of the sleeve bearing 1. A shaft 2 of a hardened and ground steel with an outside diameter of 40 mm (40e6) serves as the counter-rotating partner.

Clear improvements in the running time were found in the mixed friction field during the long-term test compared with the present state of the art.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A sleeve bearing with inner recesses, which each are arranged in its front areas, and in which is fastened by means of a holding part a lip seal rotating in a peripheral direction, which lip seal rests with a pretensioned sealing lip projecting over the front surface linearly on an associated sliding partner shaft, with an annular cavity having an annular thickness A being formed between the holding part and the shaft, wherein the holding part is force-lockingly received into an annular groove of the recess, wherein between the holding part and the sealing lip there is provided a support part also spaced from the shaft, and wherein the sealing lip is attached to the support part outside of the front surface.

2. The sleeve bearing according to claim 1, wherein the holding part is pressed into the annular groove with a holding foot.

3. The sleeve bearing according to claim 2, wherein the groove width is $B \geq 0.6$ mm and the groove depth is $T \geq 0.5$ mm.

4. The sleeve bearing according to claim 3, wherein the groove width B is in the range of 0.8–1.5 mm.

5. The sleeve bearing according to claim 4, wherein a width S of a support edge for the support part is $S \geq 0.5$ mm.

6. The sleeve bearing according to claim 5, wherein the width is $S = 0.7-1.5$ mm.

7. The sleeve bearing according to claim 1, wherein the holding part is fastened with an adhesive instead of the force-locking fastening in the recess.

8. The sleeve bearing according to claim 1, wherein a thickness D of the lip seal is $D \geq 0.5$ mm.

9. The sleeve bearing according to claim 1, wherein the thickness A of the annular cavity is $A \geq 0.1$ mm.

10. The sleeve bearing according to claim 1, wherein the annular cavity is filled with lubricant.

11. The sleeve bearing according to claim 1, wherein the underside of the holding part and of the support part, which underside is directed toward the shaft/axis, is designed smooth.

12. The sleeve bearing according to claim 1, wherein a cavity for the lubricant is arranged in the holding part.

13. The sleeve bearing according to claim 12, wherein the height H of the cavity corresponds to at least twice the thickness A.

14. The sleeve bearing according to claim 1, wherein the sealing lip is attached to the support part without an offset.

* * * * *